(No Model.) 4 Sheets—Sheet 1.

W. H. MILLER.
ELECTRIC ARC LAMP.

No. 376,007. Patented Jan. 3, 1888.

Witnesses:
Ernest Abshagen
A. C. Sexton.

Inventor:
William H. Miller
Geo. H. Benjamin
By his Attorney:

N. PETERS, Photo-Lithographer, Washington, D. C.

(No Model.) 4 Sheets—Sheet 2.
W. H. MILLER
ELECTRIC ARC LAMP.
No. 376,007. Patented Jan. 3, 1888.
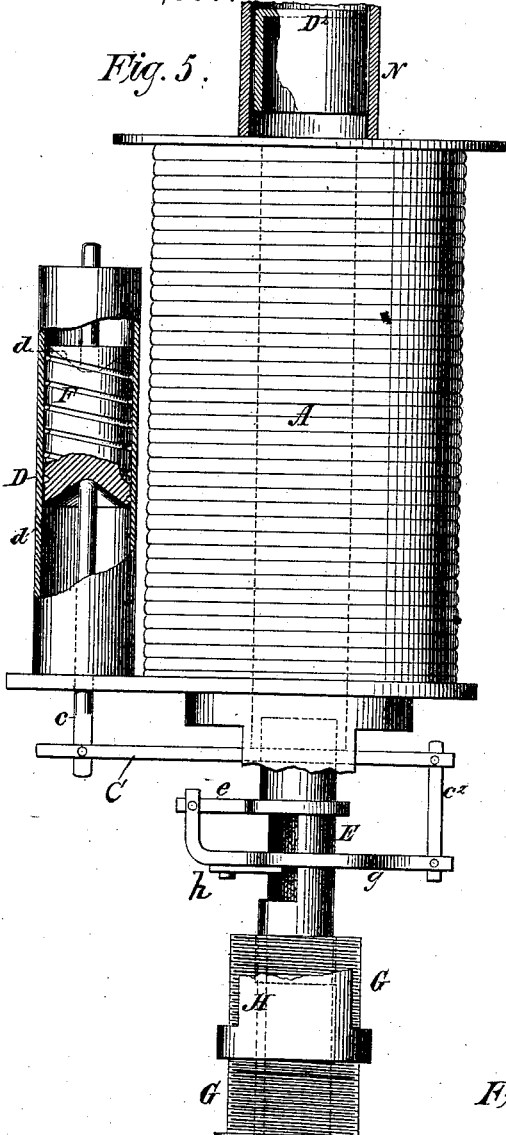
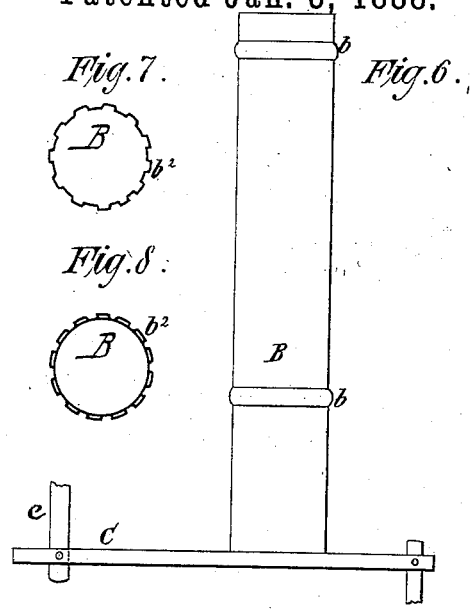
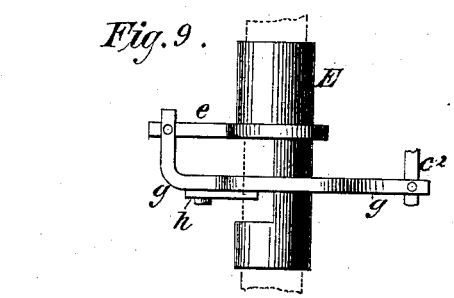
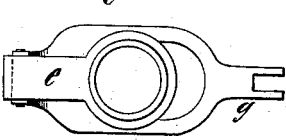
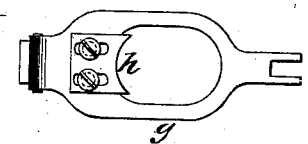
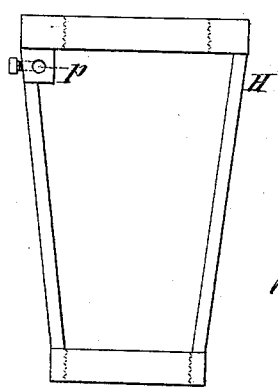
WITNESSES:
Gustave Dieterich
N. A. French
INVENTOR
William H. Miller
BY
Geo. H. Benjamin
ATTORNEY (No Model.) 4 Sheets—Sheet. 3.
W. H. MILLER.
ELECTRIC ARC LAMP.
No. 376,007. Patented Jan. 3, 1888.
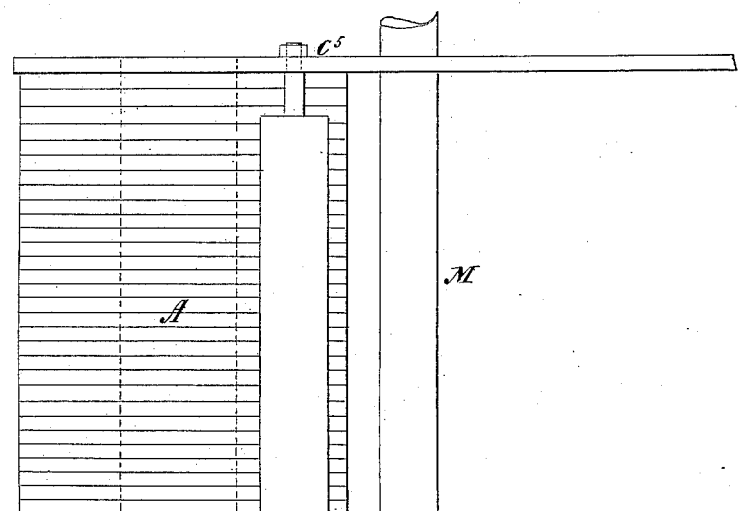
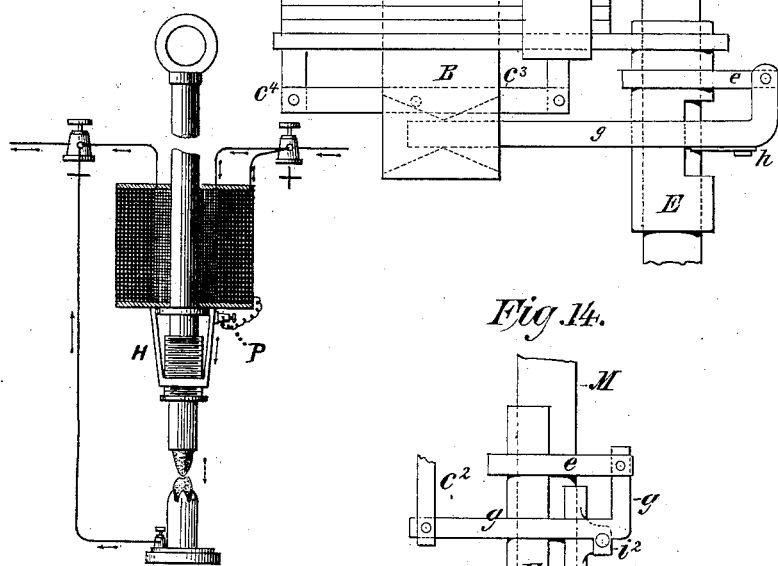
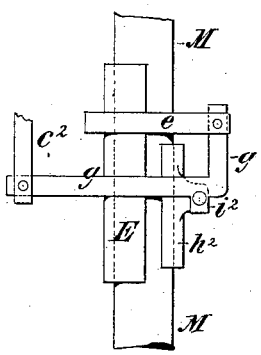
WITNESSES:
Gustave Dieterich
W. A. French
INVENTOR
William H. Miller
BY
Geo. H. Benjamin
ATTORNEY (No Model.) 4 Sheets—Sheet 4.
W. H. MILLER.
ELECTRIC ARC LAMP.
No. 376,007. Patented Jan. 3, 1888.
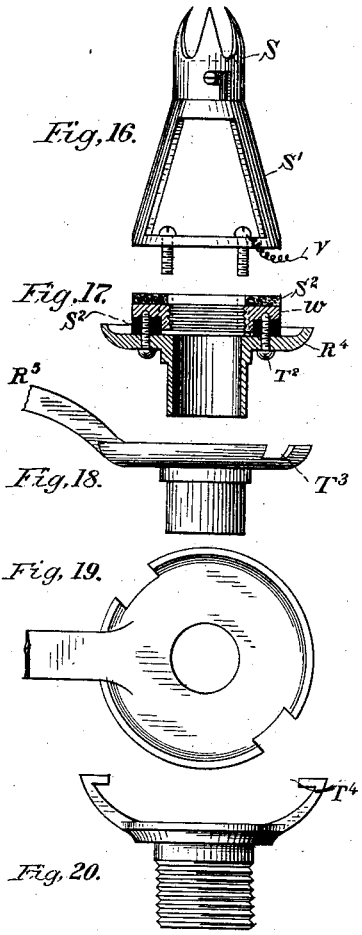
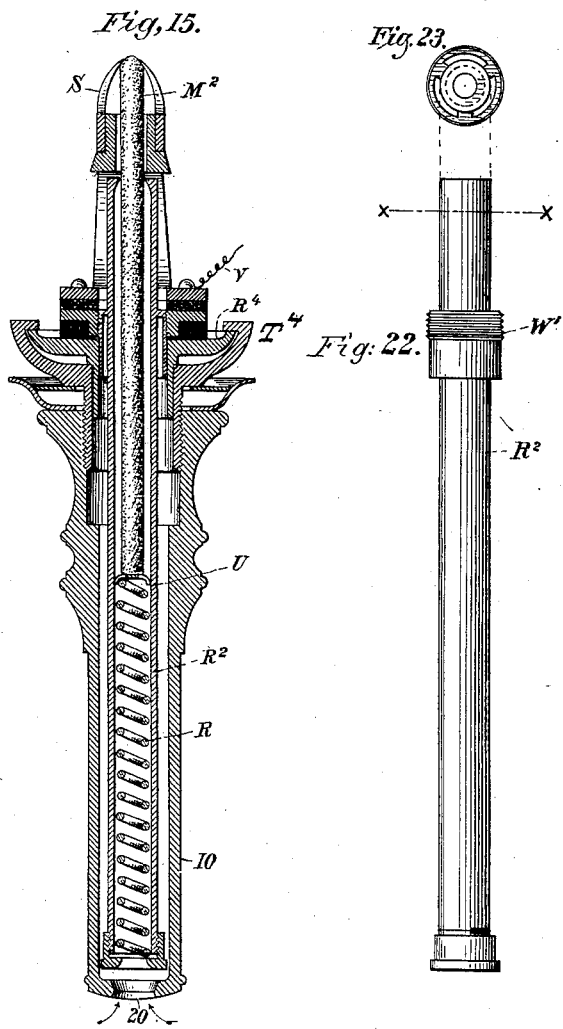

UNITED STATES PATENT OFFICE.

WILLIAM H. MILLER, OF NEW YORK, N. Y.

ELECTRIC-ARC LAMP.

SPECIFICATION forming part of Letters Patent No. 376,007, dated January 3, 1888.

Application filed June 16, 1884. Serial No. 135,068. (No model.)

*To all whom it may concern:*

Be it known that I, WILLIAM H. MILLER, of the city, county, and State of New York, have invented a new and useful Improvement in Electric-Arc Lamps, of which the following is a specification.

My invention relates to that class of electric-arc lamps in which the voltaic arc is maintained at one unvarying position during consumption of the electrodes, thereby producing what is commonly known as a "focusing-lamp."

The novel combination of parts and devices and the improvements in the details of construction that constitute my invention will be first described with relation to the drawings, and will then be specified more particularly in the claims.

In the accompanying drawings, forming a part of this specification, similar letters of reference represent like parts.

Figure 1:
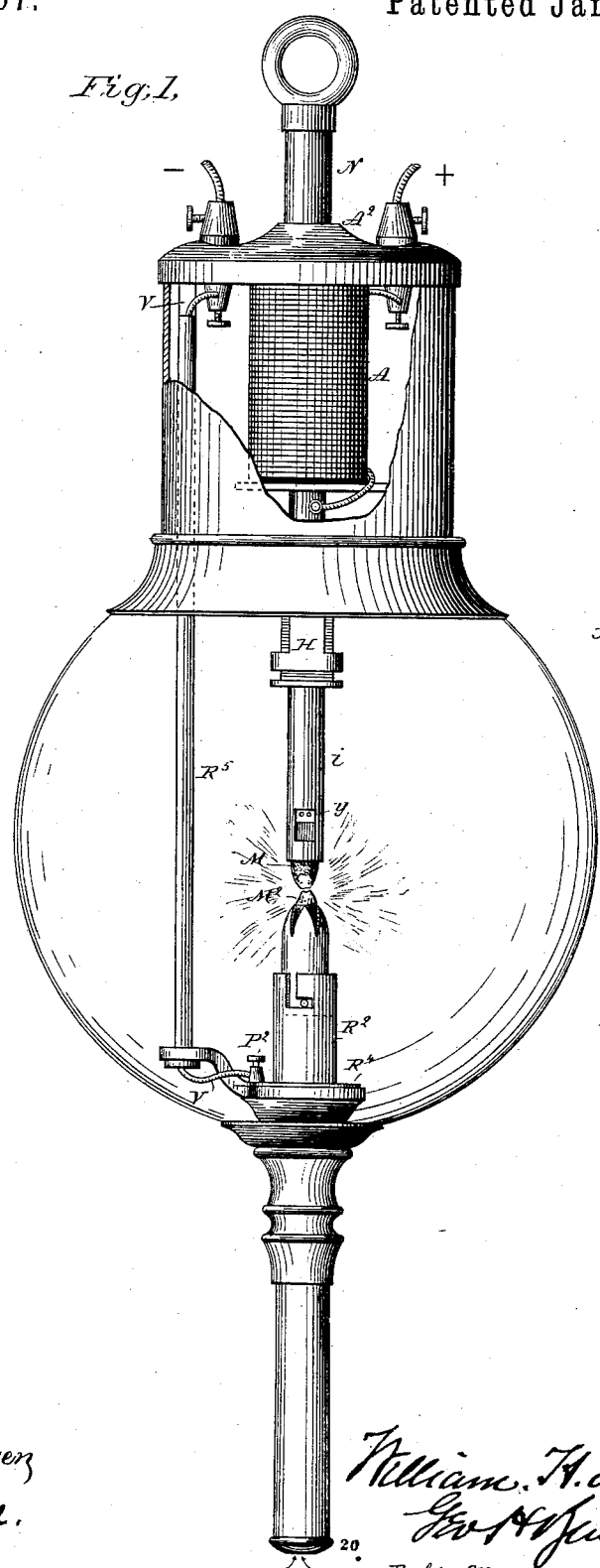
Figure 2:
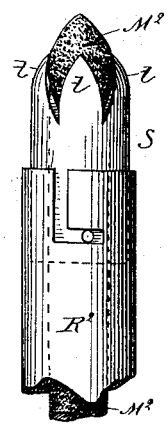
Figure 3:
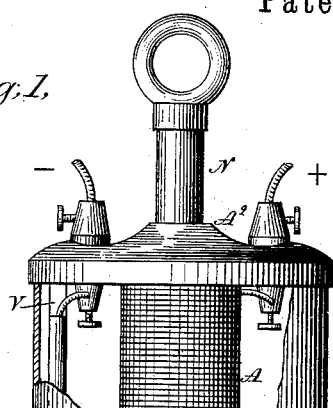
Figure 4:
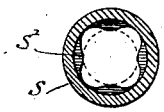

Figure 1 is a front elevation of a lamp embodying my invention, parts being broken away in order to better show the construction. Fig. 2 shows in elevation the guide and feed governing abutment for the lower or negative carbon. Fig. 3 shows a vertical section one form of my improved abutment sleeve or tube. Fig. 4 is a horizontal section on the line $x\,x$ of Fig. 3. Fig. 5 shows in elevation the upper portion of the lamp enlarged, the novel dash-pot construction being shown in partial section. Fig. 6 is an elevation of the magnet-core and armature. Figs. 7 and 8 are cross-sections of modified forms of magnet-core. Fig. 9 is a detail view of the clutch or clamp in elevation. Fig. 10 is a plan view of the same. Fig. 11 shows the clutching or gripping lever from the under side. Fig. 12 is an elevation of a frame for supporting certain detail parts. Fig. 13 is an elevation of a lamp having a modified disposition of the feed-regulating magnet. Fig. 14 shows in elevation a modification of the clutch. Fig. 15 is a vertical section of the lower-carbon holder. Fig. 16 is an elevation of the yoke supporting the abutment-piece. Fig. 17 is a vertical section of the cup which supports the yoke or saddle, and shows the interposed rings of non-conducting material. Fig. 18 is an elevation of the cylindrical base or cup forming a part of the frame of the lamp, and which supports the lower-carbon holder. Fig. 19 is a plan view of the same. Fig. 20 is an elevation of the connecting ring-clutch, to which the inclosing-tube at the base of the lamp is connected. Fig. 21 is a plan view of the same. Fig. 22 is an elevation of the tube which contains the carbon and its actuating-spring. Fig. 23 is a transverse section of the same, taken on the line $x\,x$ of Fig. 22. Fig. 24 is a view of a modification, showing the application of the yoke H to the solenoid and the electrical connection therewith, and also the electrical connections with the lower carbon.

A indicates a differential electro magnet of any desired construction, attached in any suitable manner to the upper plate, $A^2$, of the lamp, and by preference having a hollow movable core, B, for the passage of the upper or positive electrode of the lamp, said core being arranged to work up and down in tube or cylinder upon which the coils of A are wound. The coils upon A are supposed to be the usual main and derived circuit coils of an electric lamp, said main-circuit coils being of coarse wire and in circuit with the electrodes and arc, while the derived-circuit coils, which are of fine wire, are so wound and connected as to oppose or tend to counteract the influence of the main-circuit coils and in a branch or derived circuit of high resistance around the arc. Said main-circuit coils act upon the well-known principle to raise the core, and by suitable intermediate mechanism to lift the upper electrode, while the derived-circuit coils cut down the lifting-power as the arc increases in length, so as to finally cause the lifting action to cease, to then cause a lowering of the core, and finally permit the core to drop so far as to cause a release and feed of the upper electrode to take place. The core B of the solenoid is, as already remarked, made hollow to allow the carbon to pass through it, and works in a guiding tube or way (not shown) within the solenoid. In order to reduce the number of bearing-points between the core and the tube, and to avoid friction as far as possible, said core is provided with two or more beads or projecting rings, $b$, which constitute the only parts of contact or bearing between the core and the tube in which it moves, which may be either worked out of the metal of B or they may be separately formed beads or rings attached to said core. Instead of transverse beads or rings, the core may be provided with longitudinal flutings, ribs, or corrugations worked out of the material or attached to the core B, as indicated at $b^2\ b^2$, Figs. 7 and 8, showing such modified forms of core in cross-section, or the internal surfaces of the solenoid-tube carrying the coils may be fluted or ribbed for the same purpose, as indicated in Fig. 24, where the core-tube and solenoid are shown in transverse section. In both such arrangements the body or main portion of the core is kept out of contact with the tube, and the friction of the parts is reduced to a minimum.

Attached to the end of core B, in any suitable manner, is a cross-bar, C, one end of which connects with the plunger-rod $c$ of an air dash-pot, D, which latter is mounted on a platform formed by extending the head of the magnet-spool, or upon other suitable support. The other end of the bar C is connected by a link, $c^2$, with suitable lifting and adjusting mechanism for the upper or positive electrode, M, of the lamp, preferably of the form to be presently described.

On the plunger F of the dash-pot I provide a spiral groove which surrounds the plunger, but which ends blindly and does not connect the air-spaces above and below the plunger, while in the ends of said plunger, which is guided at both ends of the dash-pot, are the depressions or inverted cup or cone shaped cavities marked $d$. The object of this arrangement is, by means of the air-packing of the plunger, (the air contained in the spiral groove serving as a packing in the manner well understood,) to increase the resistance of the parts without mechanical friction, and to thus check any sudden movement of the core and of the electrode M, supported and controlled thereby. The lifting and feed-adjusting mechanism for the electrode M consists of a sleeve or barrel, E, guided vertically in line with the carbon M, so that it may act properly as a guide for the same, and carrying a gripping or clutching dog or toe, $g$, pivoted on extension $e$ from said sleeve, and connected by link $c^2$ at its opposite end with the cross-bar C and the movable magnet-core. The gripping or engaging surface of the dog $g$ consists of a block, $h$, of any suitable material, preferably of steel, which is attached to $g$ by screws passing through slots in the block, so as to permit an adjustment of the block with relation to the carbon electrode M, or carbon-carrier, against which it impinges through an opening in the sleeve or guide E. The clutching dog or toe is brought into engagement with the electrode by the raising of its end connected to link $c^2$ at the opposite side of the electrode from the gripping-surface. The block $h$ might be formed in one piece with the lever $g$, if desired. If the magnet be placed to one side of the electrode, the lever $g$ might be connected directly to its core. The barrel or sleeve E is guided at its upper end by fitting into the end of the core B, or by fitting into or onto the end of the guide-tube in which the core moves, or by other suitable device. Its lower end is similarly guided by fitting into a recess in the end of a hollow screw, G, which acts both to determine the point at which, in the downward movement of the core, the clutch shall release the electrode, and also serves with or without an attached tube to guide the electrode. The said screw G works in the bottom cross-bar of a frame, H, the upper end of which latter is suitably secured to or supported from the end of the magnet by screwing it onto the tube upon which the coils are wound, or upon a boss formed on the spool-head, as may be desired. When the clutch-lever $g$ is lifted by the core, the gripping-block $h$ is made to bear against the side of the electrode M and holds the latter against the internal surface of the sleeve E, and, if further lifting movement ensue, the sleeve E is raised vertically in its guideways, thus lifting the electrode M to form an arc at starting or to increase the length of the arc upon an increase of current flow on the circuit. When the sleeve and pivoted dog $g$ are lowered, the sleeve finally comes to rest upon the bottom of the guide or recess for it in the screw G, and the movement of the clutch-lever $g$ is then such as to disengage the electrode, which latter then feeds downward under the action of gravity. By thus arranging the guided sleeve and the pivoted clamping dog or toe the electrode will be held against the flat side of the clamp-tube and cannot be thrown out of perpendicular through tilting or swinging movement of the latter to one side. As the power applied to the pivoted dog $g$ is applied to the long arm of the lever and the gripping jaw $h$ is between the fulcrum and the point of application of the power, a firm grip is produced without possibility of slip. By giving the lever $g$ a bent form, as shown, I secure a rapid or increased movement of the clutch-block $h$ to and from the electrode, the result being a very sensitive and delicate action without danger of overfeed or a flaming arc, due to roughness or dirt on the surface of the electrode or arc, and therefore a very gradual feed movement and steady light. The clutch device, as a whole, allows the utmost freedom of movement of the electrode in the lifting action of the magnet, but renders a downward movement impossible, except when permitted by the meeting of the sleeve E with the adjusting-screw G. It is obvious that, so far as the clutching action of this device is concerned, the side of the sleeve or tube opposite the gripping-block $h$ is the effective surface, and it is therefore expedient to cut away one side of said tube and make it semi-cylindrical, as indicated.

In Fig. 14, where the parts are shown reversed, instead of a gripping block or clutch surface such as $h$, a grip or dog in the form of a shoe, $h^2$, conformed to the rod or electrode, may be employed, said shoe being loosely pivoted to the clutch-lever $g$ at $i^2$, as indicated. This form is in principle the same as that already described. The half tube E would be guided as before, and it, with the pivoted shoe $h^2$, would serve to guide the electrode M. The shoe $h^2$ may be regarded as a half of the tube and as interposed between the gripping-block constituted by the point of bearing of the lever upon the shoe and the electrode M. The shoe may be balanced so as to always retain a perpendicular position, so that it will move bodily away from the electrode, or it may be balanced so that its upper end will fall inward against the electrode, thereby assisting in giving a downward movement to the electrode when the part E comes to rest. The internal surface of the shoe $h^2$ may, if desired, be roughened, toothed, or serrated, in order to assist it in taking hold of the electrode and carrying it downward in case gravity alone acting on the electrode should not be sufficient.

It is essential to the operation of the clutch that the gripping-lever $g$ be pivoted at one extremity and the lifting mechanism at the other, and the gripping-block itself affixed to the lever at a point between these two points, or at or near the angle of the lever. The lifting mechanism must be attached to the long arm of the lever, and the gripping-block form the short arm. The release of the carbon will thereby be produced by arresting the motion of the tube E, so that the motion of the grip at the instant of impact and release is always in the direction to assist the movement of the electrode. In many of the clutching devices now in use this movement of the electrode is reversed, and at the instant of impact between the electrodes and the grip the electrode is forced downward, in order to produce a firm grip, and at the instant of release the electrode has to be lifted to a like extent in order to effect its release. This condition I have found to interfere with the sensitive action of the lamp.

In the modified disposition of the parts shown in Fig. 13 the magnet is to one side of the electrode M and the latter moves through suitable guides independent of the core B or the guide-tube for the latter. In this form the clutch-lever $g$ is connected directly with the end of the core B, the latter having an opening provided with the double knife-edges, between which the end of lever $g$ rests. A lever, $c^3$, pivoted in a bracket, $c^4$, and provided with a pin or stud resting on an inclined surface in the core, imparts movement to the cylinder of the dash-pot D, the plunger-rod of said dash-pot being supported from the cross-piece $c^5$. The screw G, while serving as a guide for the electrode, also serves to bring the electric current to the electrode at a point near the arc and to thus diminish the resistance interposed by said electrode, while at the same time (by reason of the fact that the lower carbon is made to feed upward as it consumes, so as to keep the arc always at the same point) it serves to keep the resistance constant. To this end the screw G is made of metal and is kept in constant electrical connection with the electrode by means of suitable contact-springs, $y$, connected to the screw or to a downwardly-projecting tube, $i$, of metal, forming also a guide for the electrode. The springs $y$ are preferably applied to the electrode at a point as near as practicable to the arc, so as to bring the current directly to the electrode near its end.

$D^2$ indicates a cup of insulating material that fits loosely in the tube N, projecting above the lamp for the reception of the upper end of the positive electrode. Said cup is adapted to rest loosely on the top of the magnet or other support and over the tube or guide in which the electrode moves. When an electrode is inserted, the cup is picked up thereby, and, while the end of the electrode or holder therefor remains in the tube N, insulates the tube and electrode from one another.

$M^2$ indicates the lower or negative carbon or electrode of the lamp, and $R^2$ a tube or guide in which said electrode or electrode-holder moves upward under the action of a spring, R. Arranged over the top of the spring, and between it and the electrode, is a follower, U, made of any non-conducting material—such for instance, as asbestus.

S indicates an abutment-piece, against which the electrode is constantly forced by the action of the spring, and that is suitably formed to permit said electrode to be moved gradually upward as its end wastes in the arc. The abutment S may be arranged on the tube $R^2$ or upon a yoke, S', as shown in Figs. 15 and 16, and the yoke mounted upon the non-conducting ring $S^2$, supported in the base-cup T', the object of this arrangement being to prevent the heat of the arc from being conducted downward to the carbon holder and spring. The abutment should be constructed to allow the electrode to project normally from one-fifth to three-eighths of an inch, sufficient to prevent it from casting any shadow and to secure the abutment from being destroyed by the action of heat. I prefer to construct the abutment, as shown, from a tube or sleeve made of any suitable material not readily destroyed by heat, preferably iron, and to provide it with three or more introverted serrations, teeth, or points, $t$, for the electrode to press against, which teeth, if accidentally destroyed, may be repointed from the material of the tube and bent inward to proper position, said process being repeated until the tube S is consumed. The lower end of the tube S may be counterbored, as shown in Fig. 3, so as to form a guide, collar, or neck at $k$ of proper size to allow passage of the electrode, or it may be formed as shown in Figs. 15 and 16, where the abutment-tube S fits over the neck of the saddle S', the object in either case being to cause a second electrode in the tube to follow the first squarely and allow the last quarter-inch or less to be consumed, the one piece passing out and the next following with a barely-perceptible flicker in the light; and also, by reason of the air-space between the electrode and the upper part of the abutment-piece, to preserve the latter and to prevent the otherwise rapid conduction of heat to the guide-tube and actuating-spring. The abutment is removably attached to the tube R² or saddle S' or other support by a bayonet-joint or other attachment, and may be, therefore, readily removed and replaced when desirable, as for repairs, or for the purpose of inserting a new electrode from the top of the tube. The electrode may, however, be inserted from the bottom, and for this purpose the bottom of the tube is provided with a removable stopper, U', perforated to allow ingress of air.

Between the rings of non-conducting material, S², I arrange the metallic ring $w$, which is provided with a screw-thread in its inner circumference and adapted to receive the screw $w'$ on the tube R², thus allowing the tube to be adjusted relatively to the abutment-piece S on the top of the saddle. The ring $w$ is adjusted so as not to touch the plate or flange R⁴ by means of the screws T². Cut in the periphery of the plate or flange R⁴ are the notches T³, which are adapted to receive the jaws T⁴, arranged on either side of the connecting-ring Y. Attached to the connecting-ring by means of a screw at its end is the inclosing-tube 10, which is provided with an orifice, 20, at the bottom, through which the air enters, thus producing a circulation through the tube and tending to keep it cool.

The various forms are explained by the drawings.

The mode of connecting the various portions of the lamp will be understood more readily by reference to Figs. 1 and 24. The positive binding-post of the lamp is indicated by the sign $+$ and the negative by the sign $-$. From the former connection is made directly with one terminal of the coarse wire on the magnet A, the opposite terminal being connected by a binding-screw at P on the frame H, through which and the screw G, tube $i$, and springs $y$ electrical connection is made with the positive electrode M. Current flows from the latter through the arc to the negative electrode M² when the lamp is in action or the electrodes in contact, and from the latter through the teeth of the abutment, the spring R, and tube R² to the binding-post P², mounted on and not in electrical connection with the flange or plate R⁴, into which the tube screws, with which it is otherwise suitably connected. Flange or plate R⁴ is carried by a hollow rod, R⁵, depending from the lamp-frame, and connection is made with the negative binding-post by an insulated wire, V, passing up through said rod and connected with the post P² and the negative binding-post. The fine wire or derived-circuit coil is in a connection from one post, $+$, to the other, $-$, as indicated, and therefore forms a branch or derived circuit of high resistance around the arc, as usual.

In the operation of the lamp the arc is formed in the usual way by the lifting action of the main-circuit coil on the upper electrode, and is maintained by the releasing or feeding action of the oppositely-acting derived-circuit coil, combined with the automatic feeding of the lower carbon as controlled by the abutment, which permits the latter to move upward as it consumes, thus maintaining the arc at the same point. When the upper electrode has fed down out of engagement with the clutch, it simply falls away from the same and into contact with the lower electrode, being maintained in upright position by the guide sleeves and tubes described. In such position it forms a short or low resistance path for the current for the lamp. The end of the upper electrode may be transferred to the lower holder or tube and serve as a negative electrode.

By my construction of lamp and arrangement of parts I may decrease the length of lamp to nearly one-half of those in ordinary use, or I may employ an electrode of twice the length, and thereby double the interval of time between recarbonings. A usual length of lamp, as lamps are now made, is fifty-four inches, and the length of the positive carbon consumed nine and one-half to ten inches. This length of lamp I reduce to twenty-five inches, consuming same length of carbon, or to forty inches, consuming eighteen inches of positive carbon.

What I claim as my invention is—

1. The combination, in an arc lamp, of the open-bottom tube 10, the open-bottom tube R², provided on its upper end with a bifurcated abutment for the lower carbon, an open or spider shaped follower, and a spring for lifting the said carbon, with the upper carbon controlled in its downward movement by a clutch connected with the stem of the dash-pot, substantially as described.

2. The combination, in an arc lamp, of a differential electro-magnet and upper carbon sustained therein, a clutching device, a dash-pot having a grooved plunger centered upon a stem connected to said clutching device, and a lower-carbon spring actuated and adjustable in a guided tube open at its lower end and provided with a sleeve, W', substantially as described.

3. In a focusing arc lamp, the combination of two electrodes, one a spring-actuated electrode inclosed by an open-bottom tube provided with a detachable feed-controlling abutment at its wasting end attached to a saddle, S', and the other a gravitating electrode provided with carbon separating and feeding mechanism, a clutching device controlled by a dash-pot having a spirally-grooved plunger, and an actuating or controlling magnet, substantially as described.

Signed at New York, June 11, 1884.

WILLIAM H. MILLER.

Witnesses:
W. A. FRENCH,
C. W. BENJAMIN.